United States Patent [19]

Moll

[11] Patent Number: 5,285,548
[45] Date of Patent: Feb. 15, 1994

[54] BRUSHING APPARATUS FOR CLEANING AND POLISHING PUMPKINS AND THE LIKE

[76] Inventor: Christopher A. Moll, 5980 Pease Rd., Williamson, N.Y. 14589

[21] Appl. No.: 955,294

[22] Filed: Oct. 1, 1992

Related U.S. Application Data

[63] Continuation-in-part of Ser. No. 750,872, Aug. 26, 1991, abandoned, which is a continuation of Ser. No. 541,506, Jun. 21, 1990, abandoned.

[51] Int. Cl.$^5$ ............................................. A23N 12/02
[52] U.S. Cl. .................................... 15/3.2; 15/3.16; 99/624; 99/626
[58] Field of Search .................. 15/3, 3.19, 3.16, 3.2, 15/3.13, 3.14, 3.17; 99/623, 624, 625, 626, 621, 618

[56] References Cited

U.S. PATENT DOCUMENTS

| | | | |
|---|---|---|---|
| 1,417,266 | 5/1922 | McDill | 15/21.2 |
| 1,509,447 | 9/1924 | Skinner | 15/3.2 |
| 1,684,896 | 9/1928 | Stebler | 15/88.3 |
| 1,732,180 | 10/1929 | Brogden | 99/534 |
| 2,213,489 | 9/1940 | Durand | 15/3.13 |
| 2,234,766 | 3/1941 | Kennedy et al. | 15/21.2 |
| 2,249,787 | 7/1941 | Savage | 99/624 |
| 2,619,024 | 11/1952 | Flosdorf et al. | 99/289 |
| 3,451,088 | 6/1969 | Germann | 15/97.1 |
| 3,849,195 | 11/1974 | Powell, Jr. et al. | 15/3.2 |
| 4,509,414 | 4/1985 | Chiu et al. | 99/623 |
| 4,519,305 | 5/1985 | Vanosdall | 99/626 |
| 4,697,508 | 10/1987 | Tallafus | 99/517 |
| 4,827,836 | 5/1989 | Neidigh | 99/626 |

Primary Examiner—Stephen F. Gerrity
Assistant Examiner—James F. Hook
Attorney, Agent, or Firm—Robert J. Bird

[57] ABSTRACT

Brushing apparatus for cleaning and polishing farm produce includes three rotating cylindrical helical brushes forming a brush channel. The brushes rotate in the same direction but at different speeds to clean and polish the produce, and to "walk" it along the brush channel. The brush bristles are the only things touching the produce, and the sole way by which produce is moved along the brush channel. The brushes and brush channel are adjustable up or down from the horizontal to control the throughput rate of articles of produce.

3 Claims, 2 Drawing Sheets

BRUSHING APPARATUS FOR CLEANING AND POLISHING PUMPKINS AND THE LIKE

CROSS-REFERENCE TO RELATED APPLICATION

This application is a continuation-in-part of my copending application Ser. No. 07/750,872 filed Aug. 26, 1991 now abandoned, which is a continuation of my copending application Ser. No. 07/541,506 filed Jun. 21, 1990, now abandoned.

BACKGROUND INFORMATION

This invention relates to brushing apparatus for cleaning and polishing certain vegetables, particularly pumpkins and various species of squashes.

Pumpkins and squashes grow on vines lying on plowed ground, so they are often partially covered or caked with dried mud. Cleaning and polishing this produce greatly enhances its marketability. The aesthetic appeal of produce which is both cleaned and polished is striking.

In the prior art generally, large articles of produce such as pumpkins and squashes are typically cleaned by hand with a brush, hose, cloth or the like; or else they are simply left in their natural state. Smaller articles such as apples and cucumbers are cleaned by brushers in which the produce moves over a series of horizontally and laterally aligned brushes. This type of brusher is not effective for cleaning larger articles of produce, such as pumpkins and squashes, typically between 6" and 18" diameter.

Prior art includes U.S. Pat. Nos. 3,451,088 to Germann; 1,732,180 to Brogden; 4,827,836 to Neidigh; 2,249,787 to Savage; 4,509,414 to Chiu. All these are of record in my earlier applications referred to above.

Germann discloses a bowling ball cleaner with three rotating cylindrical brushes forming a brush channel. The brush channel is inclined downward from entrance to exit, so that the ball moves downhill along the brush channel by gravity. The brushes all rotate at the same speed so as to get the ball spinning. The spinning ball is caused to leave the brush channel so as to brush against stationary sidewall buffing surfaces.

Brogden discloses a fruit cleaner with a pair of rotatable cylindrical brushes, one on each side of a conveyor belt. The conveyor belt drives a number of scrub brushes longitudinally between the cylindrical brushes. Brogden states that the brush rolls slope downward gently from the receiving end of the washer, but they may be arranged to slope in the opposite direction or with no slope at all. This statement is not explained, but it does not relate to throughput speed control, since produce is driven through the apparatus by the conveyor belt, not by the side brush rolls.

Neidigh discloses a produce peeler with rotating cylindrical rollers. Produce is pushed through the apparatus by a positive displacement device (an auger) which also controls the throughput speed of the apparatus. The several rollers rotate at different speeds to enhance the peeling effect.

Savage discloses a potato peeler in which potatoes move axially along abrasive rollers. The rollers are inclined downward from inlet to discharge, and the potatoes move along by gravity.

Chiu discloses a produce peeler with transverse rollers and longitudinal conveyor belts to move articles of produce over and across (not along) the rollers. The produce moves downhill from the inlet end to the discharge end. The incline of the apparatus affects the rate with which articles tumble over and across the transverse rollers, and is adjustable to control dwell time. In Chiu, articles tumble laterally over rollers. In the present invention, articles travel lengthwise in a brush channel.

Neidigh, Savage, and Chiu are devices for invasive treatment of produce (peeling, stemming, etc.). They all involve impact such as tumbling, abrasion, scraping, and the like. The impact is necessary to achieve the desired peeling or stemming action, but is acceptable because these devices are preparing the produce for immediate further processing, such as canning or freezing.

In all of these prior devices, articles are moved along and through the apparatus either by gravity or by a positive displacement device.

SUMMARY OF THE INVENTION

The present invention is a brushing apparatus for cleaning and polishing farm produce. Three rotating cylindrical helical brushes, with long resilient bristles, form a brush channel in which to cradle articles of produce. The brushes rotate in the same direction but at different speeds to clean and polish the produce, and to "walk" it along the brush channel. The brush bristles are the only things touching the produce, and the sole means by which produce is moved along the brush channel. The brushes and brush channel are adjustable up or down to control the throughput rate of articles of produce.

DRAWING

DESCRIPTION

Figure 1:
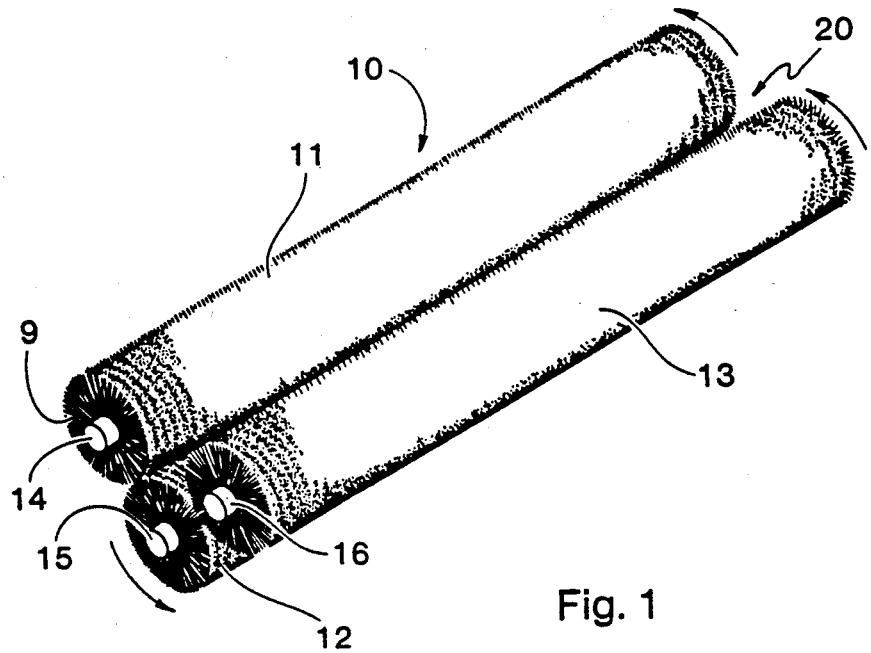
FIG. 1 is a front perspective view of part of the brushing apparatus of this invention.

FIG. 1 shows the brushing apparatus 10 of this invention, as viewed from its feed end toward its discharge end. The apparatus includes three cylindrical brushes 11, 12, 13 mounted for rotation on parallel axes or shafts 14, 15, 16 respectively. The brushes are mounted in a V relationship, with the first brush 11 at the upper left, the second brush 12 at bottom center, and the third brush 13 at the upper right, to form a brush channel 20 along their length. The brushes 11, 12, 13, and the brush channel 20 are substantially horizontal along their length.

Figure 2:
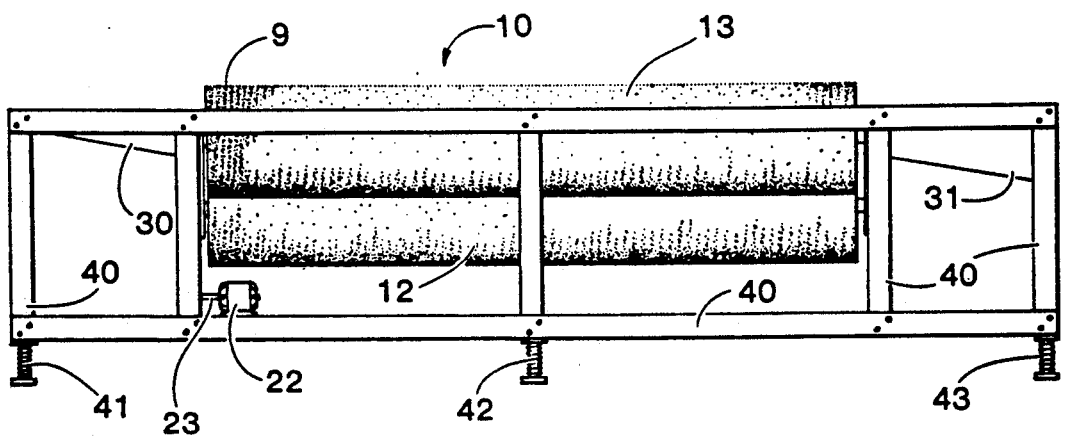
FIG. 2 is a side elevation view, as from the right side of FIG. 1.

As shown in FIG. 2, the brushing apparatus 10 includes a feed table 30 of appropriate height at the feed end of the brushes to facilitate feeding of produce into the brush channel 20, and a discharge table 31 of appropriate height at the discharge end of the brushes to receive the produce from the brush channel 20. The apparatus is supported on a frame 40 which in turn is supported at its front end, center, and rear end by threaded legs 41, 42, and 43 respectively. End plates 45 and 46, one at each end of the brushes, support the brushes for rotation.

Figure 3:
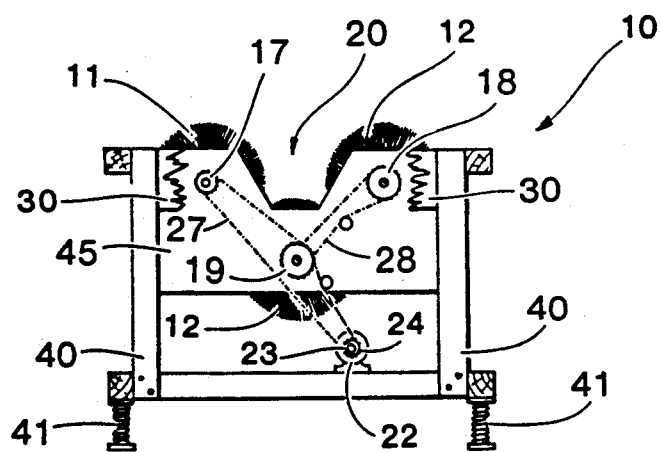
FIG. 3 is a front elevation view from the left end of FIG. 2.

As seen in FIG. 3, the brushes 11, 12, 13 are fixed to chain sprockets 17, 18, 19 respectively. The sprocket 18 on brush 12 is in fact a tandem pair of sprockets 18 and 18a (not visible behind sprocket 18). The brushes 11, 12, 13 are driven by a drive motor 22, drive shaft 23, and drive sprocket 24. A first drive chain 27 connects the drive motor 22 to sprockets 17 and 18. A second drive chain 28 connects sprocket 18a of brush 12 to sprocket 19 of brush 13. A chain drive is shown in the drawing for the sake of illustration and description, but a gear train between motor and brushes might be used instead.

The brushes all rotate in the same direction, but the sprockets are sized so that they rotate at different speeds. As an example, brush 11 rotates at 200 rpm, brush 12 at 150 rpm, and brush 13 at 100 rpm (counter clockwise as viewed in FIGS. 1, 3, 4). The outer brush 11 rotates faster than the middle (lower) brush 12, which in turn rotates faster than the outer brush 13.

The different rotational speeds of the brushes enhances their brushing action because it does not permit articles simply to roll in the brush channel (whereas brushes rotating at the same speed would tend to set up a pure rolling action, without brushing the articles in the brush channel).

Figure 4:
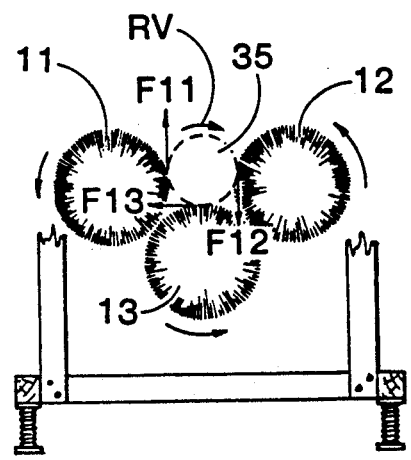
FIG. 4 is a simplified view in the same direction as FIG. 3.

The different rotational speeds of the brushes also tends to keep articles (e.g. pumpkins) within the brush channel, and not to eject them or allow them to escape between the brushes. FIG. 4 helps to understand this characteristic of the invention. Each brush imparts a tangential force to an article 35 in the brush channel. The slowest brush 13 imparts a downward tangential force F13 on the article. The faster middle brush 12 imparts a lateral tangential force F12 on the article, greater than F13 because brush 12 is faster than brush 13 and makes more brushing contact with the article. The fastest brush 11 imparts an upward tangential force F11 on the article, greater than F12 because brush 11 is faster than brush 12 and makes still more brushing contact with the article. The lateral force F12, greater than F13, prevents escape of articles between brushes 12 and 13. Similarly, the upward force F11, greater than F12, prevents escape of articles between brushes 11 and 12.

The apparatus is approximately 16 feet long overall. The brushes are approximately 10 feet long, and preferably all of the same diameter. My initial and primary use of the apparatus has been for pumpkins, for which I use 16" diameter brushes. These 16" brushes are effective also with smaller articles, such as squashes. They are not effective, however, with apples. Thus it appears that there is some relationship, albeit empirical and not yet defined, between brush diameter and the size of the produce being cleaned. I suggest that acceptable ratios of brush diameter to produce "diameter" might range from 1:1 to 3:1.

The brushes 11, 12, 13 have long bristles 9 and a small diameter shaft. The 16" diameter brushes have a hub or shaft of only 2.5" diameter, and the rest is bristle. That is to say, the outside diameters of the brushes 11, 12, 13 are at least five times the diameters of the shafts 14, 15, 16. This is significant. The brushes are more bristle and less shaft so that the bristles are resilient, and so the articles of produce are in contact only with bristle and not with shaft. The brush bristles are polypropylene of uniform size and thickness. I have used brushes with 0.028" diameter bristles, and brushes with bristles of 0.040"×0.075" rectangular cross section (the effective equivalent of 0.050" diameter) with good results from both. These sizes of bristles appear to be at the low and high ends respectively of the usable range. I presently prefer thicker bristles within that range, such as 0.040" diameter bristles.

Figure 5:
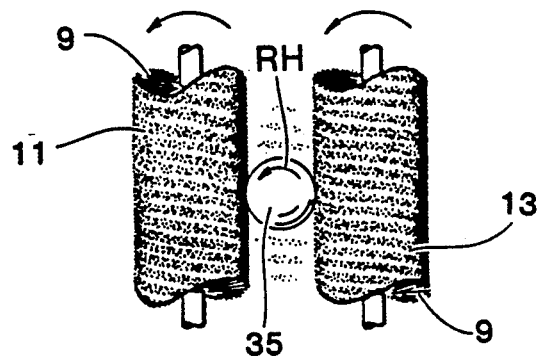
FIG. 5 is a partial top view of FIG. 4.

The brushes 11, 12, 13 are left handed helical, ⅜" pitch, as indicated in FIGS. 1, 2, and 5. With the brushes rotating in the direction indicated, the brush bristles "travel" from right to left along the brush axes, that is, from their discharge end to their feed end. FIG. 4 shows an article of produce 35 in the brush channel formed by brushes 11, 12, 13. The arrow Rv in FIG. 4 represents rotation in the vertical plane, imparted by torque to the article 35 by the rotating brushes. FIG. 5, a partial top view of FIG. 4, represents a smaller rotational vector Rh in the horizontal plane, imparted by torque to the article 35 by the axial "travel" of the helical brush bristles. The resultant of these forces Rv and Rh is a rotation of the article 35 on an axis somewhat skewed relative to the brush channel 20, such that the article 35 moves or "walks" along the brush channel 20 toward its discharge end, from left to right in FIGS. 1 and 2.

The brushes 11, 12, 13 and brush channel 20 are generally horizontal, but they are adjustable up or down from the horizontal by means of the adjustable frame legs 41, 42, 43. The incline of the brush channel affects the speed with which articles of produce move or "walk" along the brushes. When the brushes are level, pumpkins may walk over them too fast for a thorough cleaning. But since the walking action occurs even "uphill", walking speed can be controlled by adjustment of the incline, up or down. A three degree upward incline of the brushes from the feed end to the discharge end appears to give the best results for pumpkins grown in my soil. A slightly different incline may be more appropriate for pumpkins grown elsewhere. The inclination of the brush channel will probably be in the range from zero degrees (level) to approximately three degrees up or down from horizontal.

To summarize the operation, pumpkins or other produce are fed onto the brushes at the feed end of the brush channel 20 from the feed table 30. The brushes, all rotating in the same direction but at different speeds, effectively clean and polish the produce. They also motivate or "walk" the produce along the brush channel, from the feed end to the discharge end where it rolls from the brushes and onto the discharge table 31.

The invention is a brushing apparatus for cleaning and polishing farm produce. It is not for cutting, peeling, or stemming. It does not invade or treat the produce, and does not subject it to impact. It simply removes foreign debris from it by relatively gentle brushing action, without impact.

Central features and characteristics of the apparatus of this invention are:

1. Brushing time and throughput speed are controlled by the variable incline of the brush channel.
2. Different rotational speeds of the three brushes enhance the brushing action and keep articles within the brush channel. No side guard is required to keep articles in the brush channel, so there is no abrasion damage to the articles of produce.
3. Rotating cylindrical brushes are the sole means by which produce is moved along the brush channel. There is no conveyor or other positive displacement device to force or crush articles together. The brush bristles are the only things touching the articles as they pass through the apparatus. Articles of produce are suspended on (or "float" on) the brush bristles, and do not make contact with anything hard along their way. The brushes urge, but do not force, articles of produce along the channel. The throughput rate is not constant, but "elastic". This means the articles are not crushed against one another or against a wall if they are not unloaded at a certain rate.

These features and characteristics result in cleaned and polished produce which is not marred, dented, or gouged. This is especially important where the produce is to be sold fresh, not for canning or other processing.

The terms "article" or "articles" is sometimes used herein as a convenient abbreviated expression for "articles of produce".

The foregoing description of a preferred embodiment of this invention, including any dimensions, angles, or proportions, is intended as illustrative. The concept and scope of the invention are limited only by the following claims and equivalents thereof.

What is claimed is:

1. Brushing apparatus for cleaning and polishing farm produce, including:

first, second, and third elongated cylindrical brushes mounted for rotation on parallel and generally horizontal shafts, and disposed relative to each other to form a brush channel along the length of said brushes each of said brushes having long resilient bristles extending to a diameter at least five times the diameter of said shafts;

drive means operatively connected to said brushes to drive said brushes in the same rotational direction and at different speeds to enhance brushing action and to retain articles of produce within said brush channel, said first brush faster than said second brush, and said second brush faster than said third brush, said rotational direction being such that the tangential direction of said first brush is upward from said channel, and the tangential direction of said third brush is downward into said channel;

said bristles being the sole agent of contact with articles of produce in said brush channel, the rotation of said brushes alone effecting movement of said articles from said feed end to said discharge end along said brush channel, said brush bristles imparting vertical and horizontal torques on said articles in the brush channel, with resultant rolling action of said articles and movement toward said discharge end; and means to adjust the inclination of said brushes and said brush channel relative to the horizontal to thereby control the rate at which articles of produce move along said brush channel and the brushing time thereof.

2. Brushing apparatus as defined in claim 1, said brushes being of the same diameter and operatively connected to said drive means for rotation at different rotational speeds.

3. Brushing apparatus for cleaning and polishing farm produce, including:

first, second, and third cylindrical helical brushes mounted for rotation on parallel shafts to form a brush channel therealong in which to suspend articles of produce for movement therealong each of said brushes having long resilient bristles extending to a diameter at least five times the diameter of said shafts;

drive means to drive said brushes in the same rotational direction and at different speeds to enhance brushing action and to retain articles of produce within said brush channel;

said bristles imparting to articles of produce in said brush channel a resultant rotation to roll but not to force said articles along said channel at a variable throughput rate, said brush bristles imparting vertical and horizontal torques on said articles in the brush channel, with resultant rolling action of said articles and movement toward said discharge end; and means to vary the inclination of said brushes and said brush channel relative to the horizontal to thereby control the throughput speed of articles of produce in said brush channel and the brushing time thereof.

* * * * *